US009180959B2

(12) United States Patent
Lehmann (10) Patent No.: US 9,180,959 B2
(45) Date of Patent: Nov. 10, 2015

(54) RAPID DECOMPRESSION DETECTION SYSTEM AND METHOD

(75) Inventor: Michael Lehmann, College Place, WA (US)

(73) Assignee: Adams Rite Aerospace, Fullerton, CA (US)

(*) Notice: Subject to any disclaimer, the term of this patent is extended or adjusted under 35 U.S.C. 154(b) by 1381 days.

(21) Appl. No.: 12/921,324

(22) PCT Filed: Mar. 9, 2009

(86) PCT No.: PCT/US2009/036503
§ 371 (c)(1),
(2), (4) Date: Jan. 20, 2011

(87) PCT Pub. No.: WO2009/111776
PCT Pub. Date: Sep. 11, 2009

(65) Prior Publication Data
US 2011/0201262 A1    Aug. 18, 2011

Related U.S. Application Data

(60) Provisional application No. 61/034,776, filed on Mar. 7, 2008.

(51) Int. Cl.
*B64D 13/02* (2006.01)
*B64C 1/14* (2006.01)
*B64C 1/00* (2006.01)

(52) U.S. Cl.
CPC .............. *B64C 1/1469* (2013.01); *B64D 13/02* (2013.01); *B64C 2001/009* (2013.01)

(58) Field of Classification Search
CPC ............................... B64D 1/1469; B64D 13/02
USPC .................. 454/74; 701/3, 30.5, 33.9, 34, 99; 340/438–462, 945–983
See application file for complete search history.

(56) References Cited

U.S. PATENT DOCUMENTS 3,559,559 A    2/1971  Furlong et al.
3,571,578 A *  3/1971  Fry .................................. 700/37
(Continued)

FOREIGN PATENT DOCUMENTS

CN    1386103 A    12/2002
CN    1646366 A    7/2005
(Continued)

OTHER PUBLICATIONS

Office Action issued in CN Application No. 200980114308.6 dated Jul. 1, 2014 and translation.

*Primary Examiner* — Steven B McAllister
*Assistant Examiner* — Frances F Hamilton
(74) *Attorney, Agent, or Firm* — Baker & Hostetler LLP (57) ABSTRACT

A system for monitoring pressure change within at least one compartment of an aircraft is provided. The system includes a primary pressure sensor for providing a signal corresponding to a pressure within a primary compartment of the aircraft, a primary monitoring channel coupled to the primary pressure sensor, and an output driver coupled to the primary monitoring channel. The primary monitoring channel includes a band pass filter for receiving and filtering the primary pressure signal, a pressure change circuit for determining a change in the filtered pressure signal and for providing a pressure change output signal corresponding to the change in pressure, and a threshold logic circuit for determining whether the pressure change output signal meets a predetermined threshold and for providing a threshold output signal indicating that a decompression event has occurred if the pressure change output signal meets the predetermined threshold. The output driver receives the primary threshold output signal and outputs a notification signal.

13 Claims, 9 Drawing Sheets (56) References Cited

U.S. PATENT DOCUMENTS

| | | | |
|---|---|---|---|
| 3,658,277 A | 4/1972 | Anderson | |
| 3,680,499 A | 8/1972 | Boudreau | |
| 3,704,845 A | 12/1972 | Ord | |
| 3,728,955 A * | 4/1973 | Ricaud | 454/74 |
| 3,811,643 A | 5/1974 | Pizzo | |
| 3,829,138 A | 8/1974 | Morita | |
| 3,841,328 A | 10/1974 | Jensen | |
| 4,042,193 A | 8/1977 | Cerne | |
| 4,164,899 A | 8/1979 | Burgess | |
| 4,470,116 A * | 9/1984 | Ratchford | 701/33.4 |
| 4,522,359 A | 6/1985 | Church et al. | |
| 4,553,474 A * | 11/1985 | Wong et al. | 454/74 |
| 4,681,286 A | 7/1987 | Church et al. | |
| 4,915,326 A | 4/1990 | Plude | |
| 5,273,486 A * | 12/1993 | Emmons et al. | 454/74 |
| 5,297,987 A * | 3/1994 | Emmons et al. | 454/74 |
| 5,394,142 A * | 2/1995 | Dusart | 340/981 |
| 5,450,490 A * | 9/1995 | Jensen et al. | 380/253 |
| 5,590,852 A | 1/1997 | Olson | |
| 5,675,317 A * | 10/1997 | Ichikawa et al. | 340/507 |
| 5,691,697 A * | 11/1997 | Carvalho et al. | 340/544 |
| 6,158,692 A | 12/2000 | Abild et al. | |
| 6,484,449 B1 | 11/2002 | Artsiely | |
| 6,545,610 B2 * | 4/2003 | Kurtz et al. | 340/626 |
| 6,547,185 B2 | 4/2003 | Erben et al. | |
| 6,556,902 B2 * | 4/2003 | Ing et al. | 701/33.7 |
| 6,676,504 B2 * | 1/2004 | Petri et al. | 454/72 |
| 6,737,988 B2 * | 5/2004 | Horner et al. | 340/970 |
| 6,745,982 B2 * | 6/2004 | Lehmann | 244/118.5 |
| 6,761,628 B2 * | 7/2004 | Horner | 454/76 |
| 7,008,314 B2 * | 3/2006 | Horner et al. | 454/72 |
| 7,066,808 B2 * | 6/2006 | Whitney et al. | 454/70 |
| 7,136,794 B1 * | 11/2006 | Bechhoefer | 703/7 |
| 7,261,028 B2 * | 8/2007 | Devries et al. | 89/1.1 |
| 7,549,916 B2 * | 6/2009 | Horner et al. | 454/72 |
| 7,603,586 B1 * | 10/2009 | Skladanowski et al. | 714/31 |
| 7,633,409 B2 * | 12/2009 | Naegler et al. | 340/945 |
| 7,950,987 B2 * | 5/2011 | McCoy et al. | 454/74 |
| 2002/0173263 A1 * | 11/2002 | Petri et al. | 454/74 |
| 2004/0139110 A1 * | 7/2004 | LaMarca et al. | 707/104.1 |
| 2005/0228619 A1 * | 10/2005 | Burnet et al. | 702/189 |
| 2006/0020378 A1 * | 1/2006 | Salman et al. | 701/29 |
| 2006/0142976 A1 * | 6/2006 | Bonanni et al. | 702/189 |
| 2010/0274444 A1 * | 10/2010 | Williamson et al. | 701/34 |
| 2013/0338857 A1 * | 12/2013 | Sampigethaya | 701/3 |

FOREIGN PATENT DOCUMENTS

| | | |
|---|---|---|
| DE | 102004048217 B4 | 4/2007 |
| JP | 2001-10591 A | 1/2001 |

* cited by examiner

RAPID DECOMPRESSION DETECTION SYSTEM AND METHOD

FIELD OF THE INVENTION

The present invention relates to a sensing and signaling systems. Specifically, the present invention relates to pressure sensing systems for detecting rapid decompression events.

BACKGROUND OF THE INVENTION

Passenger aircraft are generally equipped with cockpit doors. An aircraft often has a separating partition between aircraft personnel and passengers. The cockpit door provides security and privacy in the cockpit for the pilot, copilot or flight crew. It is noted that the term "cockpit" refers to the portion of the aircraft where the pilot, copilot, or flight crew are located. The cockpit is also known as the "flight deck." This is distinguished from the cabin, which refers to the portion of the aircraft where passengers are typically located.

In many aircraft, it is required that the ambient air pressure in the cockpit be generally the same as the ambient air pressure in the passenger cabin of the aircraft. A dangerous situation may arise if there is a sufficiently great pressure difference between opposite sides of the cockpit door or any compartments separated by a partition within the aircraft. A pressure difference can cause structural deformation and lead to the loss of the aircraft. The cockpit door may be opened by a latch.

SUMMARY OF THE INVENTION

Embodiments of the present invention advantageously provide a system for and method of monitoring pressure change within at least one compartment of an aircraft to detect rapid decompression events.

In one embodiment, a system for monitoring pressure change within at least one compartment of an aircraft includes a pressure sensor for providing a signal corresponding to a pressure within a primary compartment of the aircraft, a monitoring channel coupled to the primary pressure sensor, and an output driver coupled to the monitoring channel. The monitoring channel includes a band pass filter for receiving and filtering the primary pressure signal, a pressure change circuit for determining a change in the filtered pressure signal and for providing a pressure change output signal corresponding to the change in pressure, and a threshold logic circuit for determining whether the pressure change output signal meets a predetermined threshold and for providing a threshold output signal indicating that a decompression event has occurred if the pressure change output signal meets the predetermined threshold. The output driver receives the threshold output signal and outputs a notification signal.

In another embodiment, a method of monitoring pressure change within at least one compartment of an aircraft includes receiving a pressure signal corresponding to a pressure within a primary compartment of an aircraft, determining a change in the pressure signal, determining whether the pressure change meets a predetermined threshold, and if the pressure change meets the predetermined threshold, providing a notification signal indicating that a decompression event has occurred.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

The invention will now be described with reference to the drawing figures, in which like reference numerals refer to like parts throughout.

Embodiments of the present invention provide a system for and method of monitoring pressure changes within at least one compartment of an aircraft to detect rapid decompression events. More specifically, a notification signal is provided to another device or apparatus, such as an actuator, a computer, etc., to indicate that a dangerous pressure drop may be occurring within at least one compartment of an aircraft.

Figure 1:
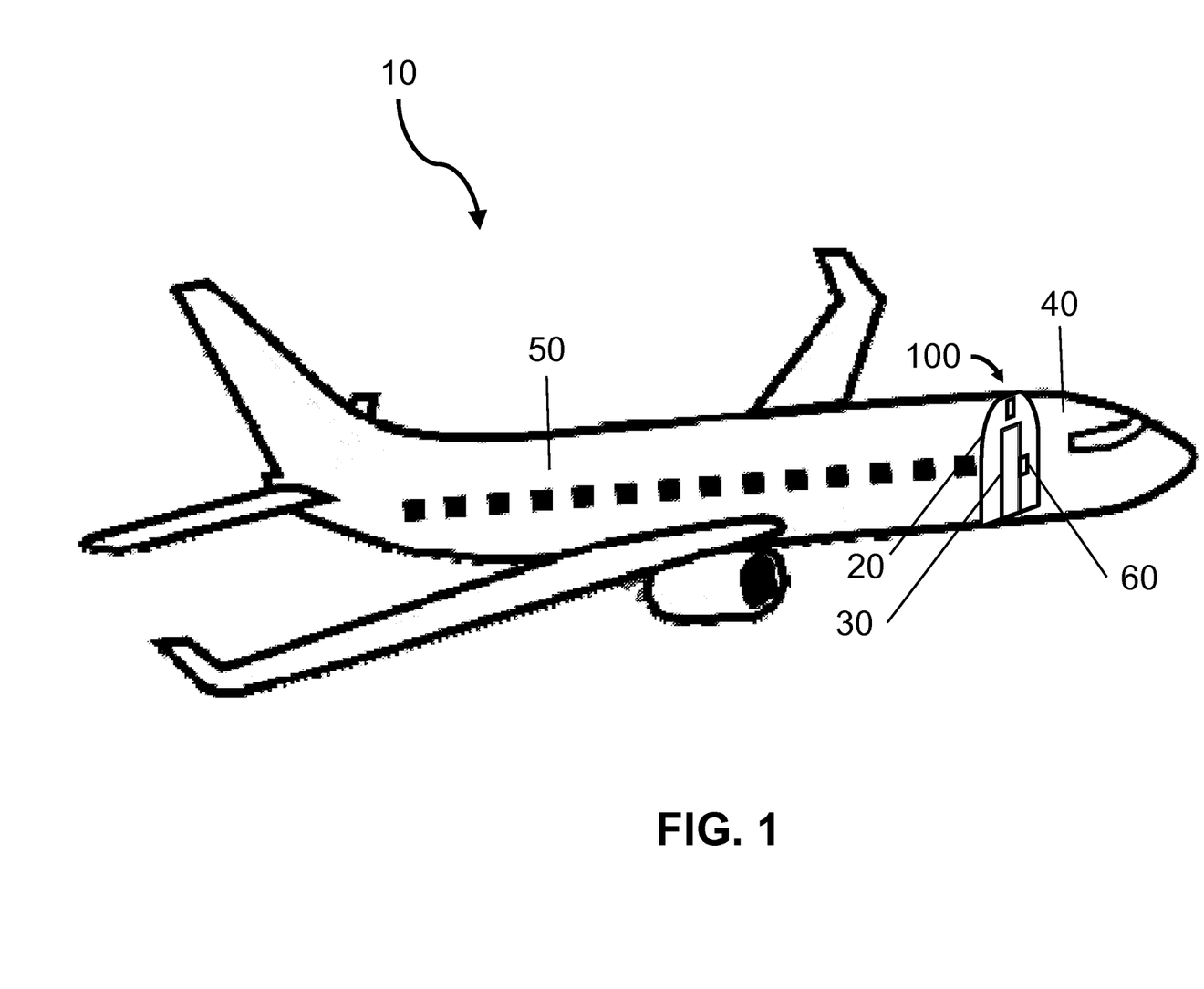
FIG. 1 is a diagram of an aircraft in accordance with an embodiment of the invention.

FIG. 1 is a diagram of an aircraft in accordance with an embodiment of the invention. As depicted within FIG. 1, sensor system 100 is typically mounted in an aircraft 10 within an aircraft cockpit 40 to primarily monitor the pressure within cockpit 40. Additionally, the pressure within an adjacent compartment, such as passenger compartment 50 or a cargo compartment, may also be monitored by sensor system 100. If a large enough pressure drop, or change in pressure $\Delta P$, is detected in cockpit 40 (or, in some embodiments, passenger compartment 50), sensor system 100 sends a notification signal to another device, system, actuator, etc.

For those embodiments in which both the cockpit 40 and the passenger compartment 50 are monitored, a typical response to the notification signal provided by sensor system 100 may be, for example, activating a door latch 60 to open a door 30 or an aperture to allow pressure equalization between the cockpit 40 and the passenger compartment 50. Sensor system 100 advantageously distinguishes between percussive events such as a gunshot or small explosion and actual decompression events.

Figure 2:
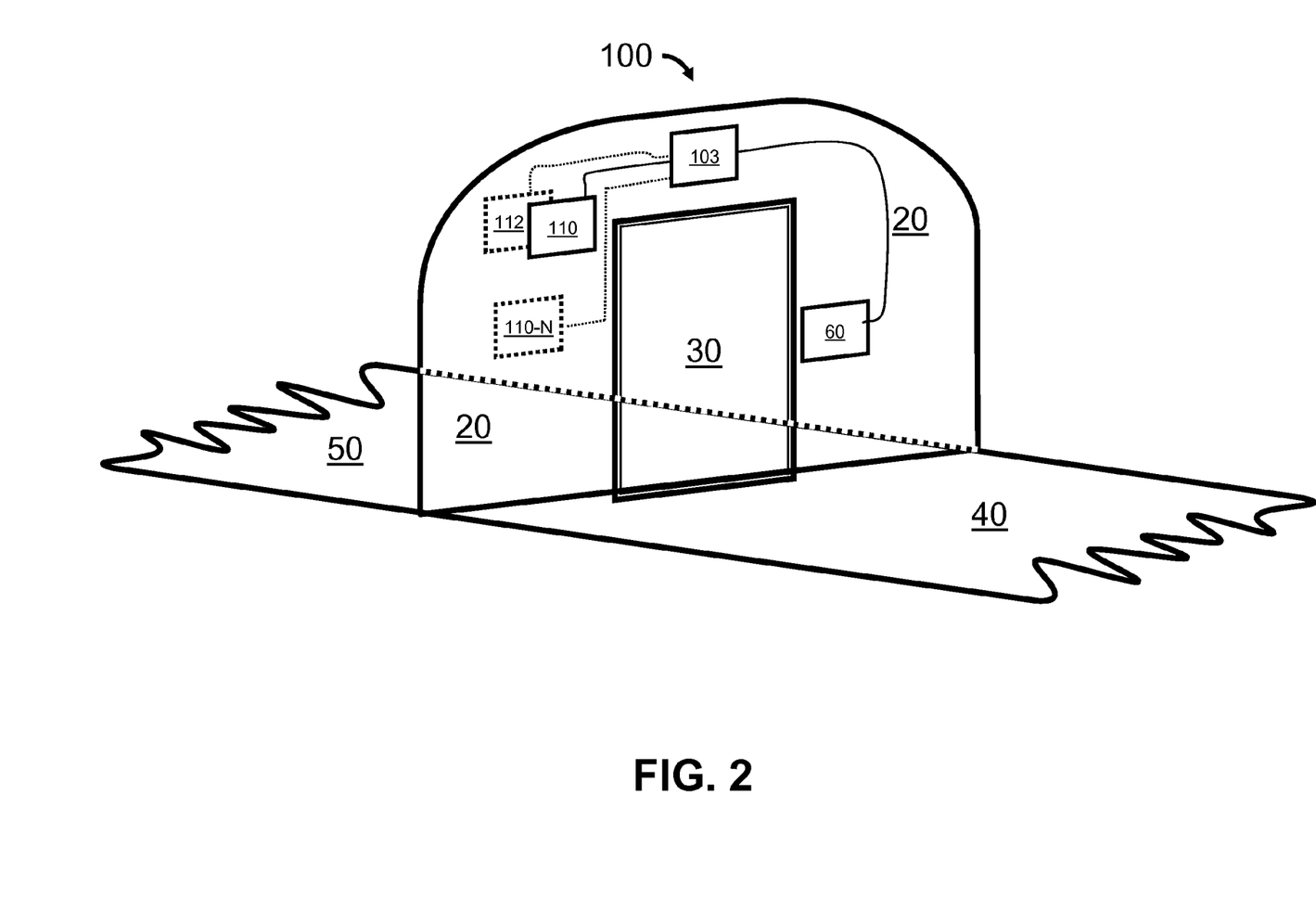
FIG. 2 is a diagram of an expanded section of the airplane of FIG. 1.

In accordance with one embodiment of the present invention of a rapid decompression sensor system, FIG. 2 is a diagram of an expanded section of the aircraft 10 of FIG. 1. Sensor system 100 includes a system controller 103, installed within the cockpit 40, coupled to at least one electronic absolute pressure sensitive device, such as a pressure sensor 110.

In one embodiment, a pressure sensor senses the pressure within either the cockpit 40 or the passenger compartment 50, such as primary pressure sensor 110, installed within cockpit 40, or secondary pressure sensor 112, remotely installed within the passenger compartment 50. If the pressure drop sensed by a pressure sensor 110 or 112 is large enough, i.e., meets a predetermined pressure drop target, system controller 103 provides a notification signal to another device, system, apparatus, etc. The notification may include informing an operator of a decompression via a visual or an auditory indication.

In another embodiment, pressure sensors 110, 112 respectively measure the pressure within cockpit 40 and adjacent passenger compartment 50, i.e., in the compartments on either side of partition 20. In this embodiment, pressure sensor 110 is installed in cockpit 40, while pressure sensor 112 is remotely installed in passenger compartment 50. Pressure sensor 110 may be installed generally within the cockpit 40, such as, for example, on partition 20, etc.; alternatively pressure sensor 110 may be located within system controller 103 and ported to the cockpit 40. If the pressure drop sensed by either pressure sensor 110 or pressure sensor 112 is large enough, i.e., meets a predetermined pressure drop target, system controller 103 provides a notification signal to another device, system, apparatus (e.g., door latch 60), etc. Additionally, system controller 103, pressure sensors 110 and 112, and the attendant cables, connectors, etc., may be shielded from tampering.

Figure 3A:
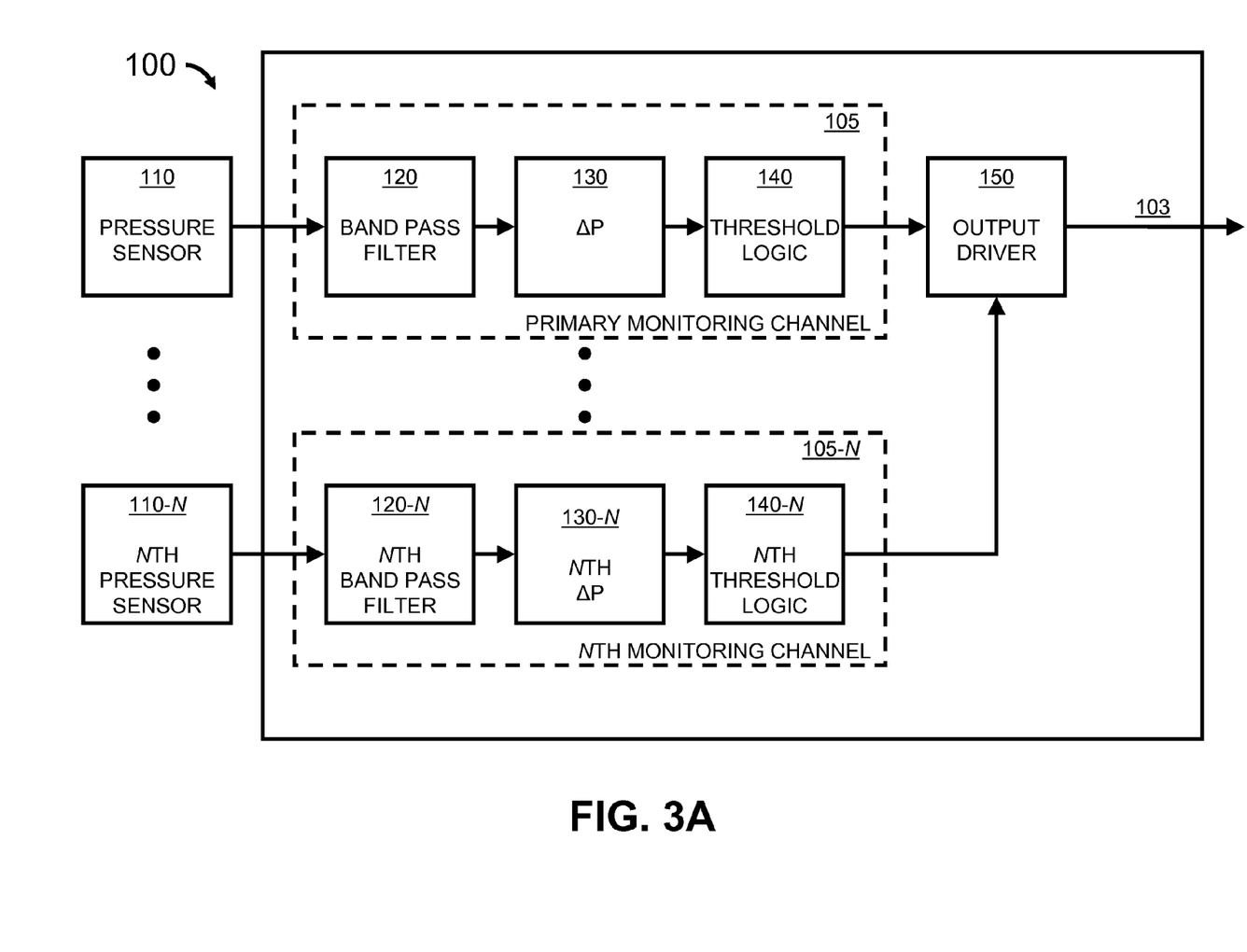
FIG. 3A is a block diagram of a signal path of a system for monitoring pressure in an aircraft in accordance with an embodiment of the invention.

FIG. 3A is a block diagram of a signal path of a system for monitoring pressure in at least one compartment of an aircraft in accordance with an embodiment of the invention. The system 100 generally includes at least one pressure sensor 110 coupled to a system controller 103. The system controller 103 includes at least a primary monitoring channel 105 and an output driver 150. The primary monitoring channel 105 includes bandpass filter 120, pressure change signal circuit 130 and a threshold logic circuit 140. In other embodiments, system controller 103 may include multiple monitoring channels 105 to 105-N, each of the N channels coupled to a respective pressure sensor 110-N.

The primary pressure sensor 110 provides a pressure signal corresponding to the pressure $P_1$ within the primary compartment of the aircraft, and a band pass filter 120 receives and filters the pressure sensor signals. The band pass filter 120 may advantageously reduce the operational noise floor and provide sensitivity only to regions of interest, which will be further explained below.

The pressure change signal circuit 130 receives the filtered pressure signal, determines a change in pressure $\Delta P_1$, and provides a pressure change output signal corresponding, to the change in pressure $\Delta P_1$, to the threshold logic circuit 140. The threshold logic circuit 140 determines whether the pressure change output signal meets a predetermined threshold and provides a threshold output signal, indicating that a decompression event has occurred, to the output driver 150 if the pressure change output meets the predetermined threshold. The output driver 150 provides a notification signal associated with the decompression event to another device, system, actuator, etc. In some embodiments, the device is an electrical or electro-mechanical device suitable to perform an action to remedy the identified decompression situation, e.g., open a door latch 60, etc.

In an embodiment that includes N pressure sensors 110 to 110-N, the system controller 103 includes N monitoring channels 105 to 105-N, each of which is coupled to a respective pressure sensor 110-N. Each of the N monitoring channels is coupled to output driver 150, which provides the notification signal if any N monitoring channel's threshold logic indicates a decompression has occurred, or, alternatively, based on a more advanced paradigm, such as a voting system. In addition, multiple monitoring channels may be used in each primary and secondary compartments to provide redundancy.

Figure 3B:
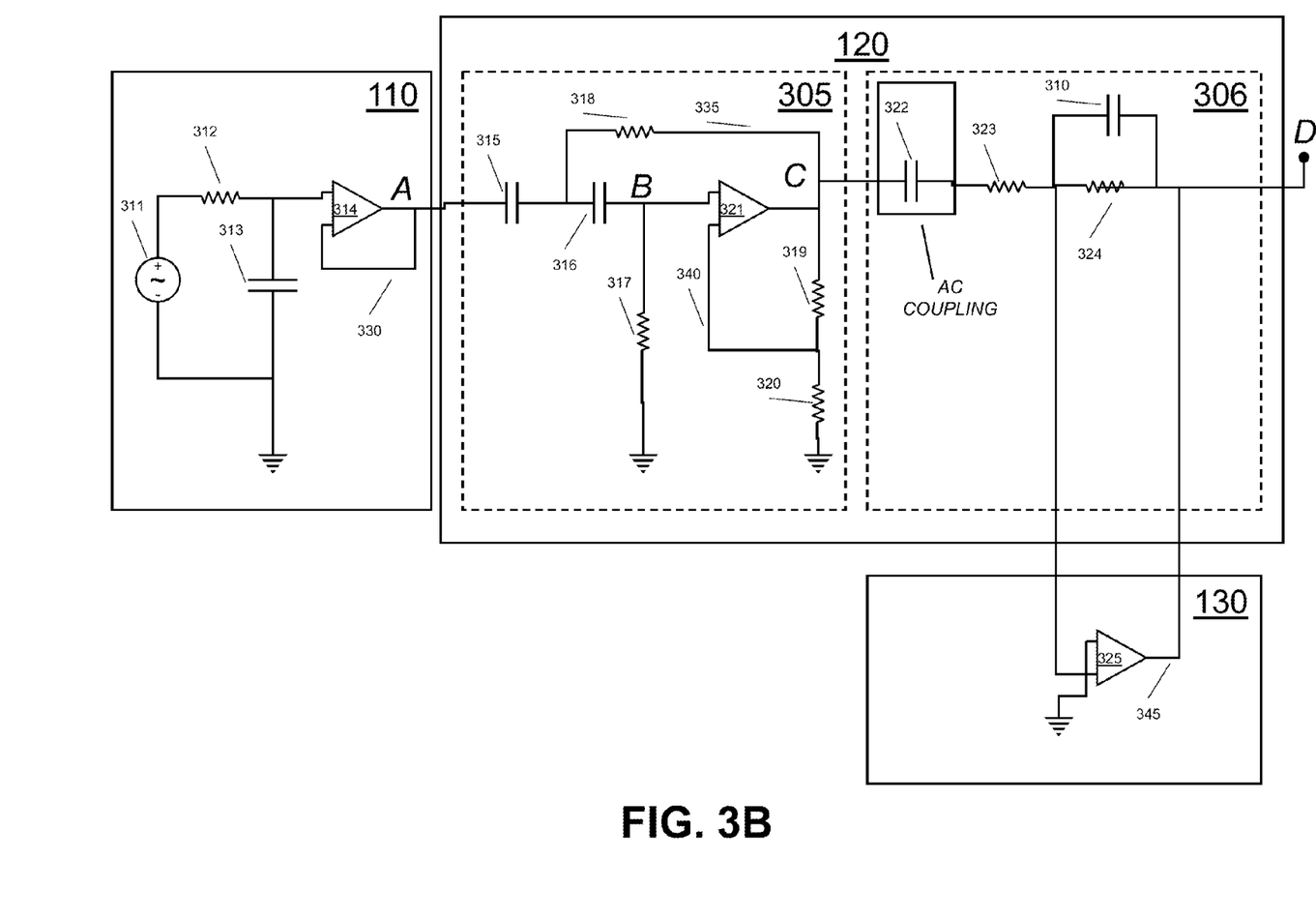
FIG. 3B is a circuit diagram of a portion of the FIG. 3A signal path.

FIG. 3B is a circuit diagram of a portion of the FIG. 3A signal path, which shows a non-limiting example of circuitry for primary pressure sensor 110, band pass filter 120, and pressure change signal circuit 130. In this embodiment, primary pressure sensor 110 includes a pressure detector 311 connected to a series RC filter, which includes a resistor 312 and a capacitor 313, which provides an input to an amplifier 314. The amplifier 314 includes a feedback loop 330 at its output at node A. The resistor 312 may have a value, for example, of 1 kΩ. The capacitor 313 may have a value, for example, of 0.5 μF. The amplifier 314 may have both positive and negative power supply inputs.

The node A output is input to a high pass filter stage 305. The high pass filter stage 305 includes second and third capacitors 315, 316 and second through fifth resistors 317-320. The second resistor 317 is provided in parallel at node B with an input of amplifier 321. The amplifier 321 includes second and third feedback loops 335, 340 from its output at node C. The second feedback loop 335 may be provided via the third resistor 318, through the third capacitor 316, and through node B. The fourth and fifth resistors 319, 320 may provide a voltage divider for the third feedback loop 340. The amplifier 321 may have both positive and negative power supply inputs. The second, third, and fifth resistors 317, 318, 320 may each have a value, for example, of 47 kΩ, although they do not need to be the same. The second and third capacitors 315, 316 may each have a value of 82 nF, although they do not need to be the same. The fourth resistor 319 may have a value of, for example, 12 kΩ.

The node C output may then pass to a low pass filter stage 306. The low pass filter stage 306 may include an optional fourth capacitor 322, which may provide AC coupling between the high pass filter stage 305 and the low pass filter stage 306. The low pass filter stage 306 may further include a sixth capacitor 310. Sixth and seventh resistors 323, 324 may provide an additional gain for the pressure change signal circuit 130. The optional fourth capacitor 322 may have a value of, for example, 14.1 uF. The sixth capacitor 310 may have a value of, for example, 1.5 nF. The sixth resistor 323 may have a value of, for example, 1 kΩ. The seventh resistor 324 may have a value of, for example, 1.5 MΩ.

The pressure change signal circuit 130 may include an amplifier 325, which may have a feedback loop 345 at its node D output, which may also include the sixth capacitor 310 and the seventh resistor 324. The output at node D is then sent to the threshold logic circuit 140. The third amplifier 325 may have both positive and negative power supply inputs.

It should be appreciated that, although example values were given for the capacitors and resistors, these are for illustrative purposes only, and any appropriate values may be used within the scope of the invention.

Figure 4:
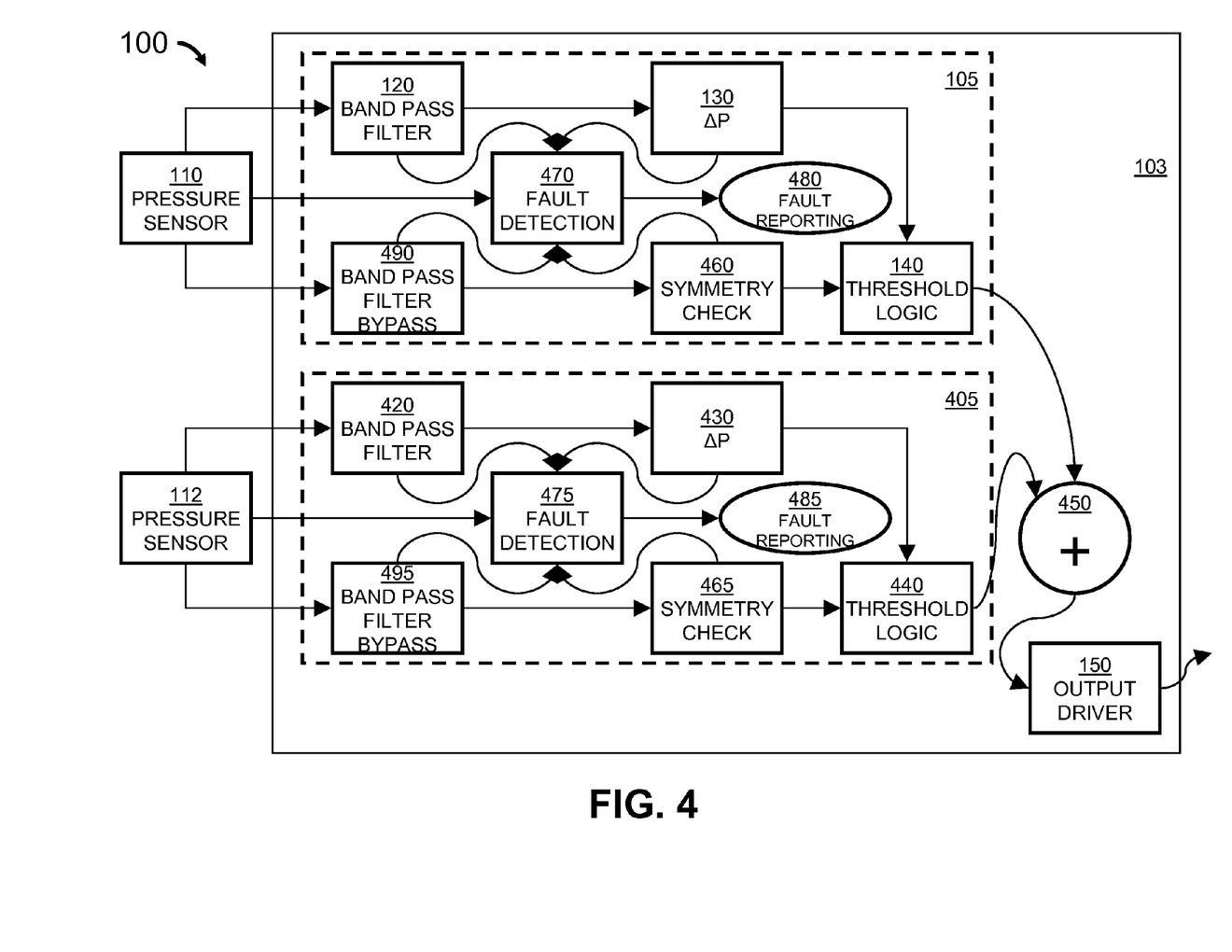
FIG. 4 is a block diagram of a signal path of another embodiment of the invention.

FIG. 4 is a block diagram of a signal path of another embodiment of the invention. In a preferred embodiment, the invention may include two independent pressure sensing channels that monitor pressure in respective, adjacent aircraft compartments. Pressure signals are processed in parallel by two different sections. System 400 includes system controller 103 coupled to primary and secondary pressure sensors 110, 112. System controller 103 includes the primary monitoring channel 105 from FIG. 3A, as well as a secondary monitoring channel 405, which includes a bandpass filter 420, a pressure change signal circuit 430, and a threshold logic circuit 440. The system 400 also includes output driver 450.

The secondary monitoring channel 405, which may correspond to the FIG. 3A monitoring channel 110-2 (N=2), performs similarly to the primary monitoring channel 105 in the FIG. 3A signal chain. The band pass filter 420 receives and filters the secondary pressure sensor 112 output, while the secondary pressure change signal circuit 430 receives the filtered pressure signal corresponding to the pressure $P_2$ within the secondary compartment, determines a change in pressure $\Delta P_2$, and provides a pressure change output signal corresponding to the change in pressure $\Delta P_2$ to the threshold logic circuit 440. The threshold logic circuit 440 receives the pressure change output signal from the pressure change signal circuit 430, determines whether the pressure change output signal meets a predetermined threshold, and provides a secondary threshold output signal indicating that a decompression event has occurred to the output driver 150 if the secondary pressure change output meets the secondary predetermined threshold.

In one embodiment, the threshold output signals from the primary and secondary monitoring circuits 105, 405 are provided to a combiner 450, which logically combines the signals and provides the combined signal to output driver 150. In other words, if either monitored compartment experiences a decompression event, then output driver 150 will provide the notification signal.

In a preferred embodiment, each monitoring channel has a respective symmetry checker 460, 465 that determines whether an event is a percussive threat, e.g., gunshots or small explosions, or if it is a valid decompression. As an input, the symmetry checkers 460, 465 may have respective bypass band pass filters 490, 495, which output the same signal as their respective primary or secondary band pass filter 120, 420. A percussive threat, such as a gunshot, would have a positive or neutral signal average, whereas a valid decompression would have a true negative signal average. In addition, the respective pressure change signal circuits 130, 430, which may be, for example, high gain pressure amplifiers, monitor the magnitude of the pressure event.

The respective threshold logic circuits 140, 440 determine if either channel independently indicates a negative-biased event simultaneous to a pressure drop of a sufficient magnitude (e.g., approximately 0.05 psi (pounds per square inch)) to warrant signaling the output driver 150 that a decompression event is occurring. The output driver 150 then directly signals another electronic system (not shown), drives an electromechanical device (e.g., door latch 60 in FIG. 2), etc., to indicate that a decompression event has occurred.

The respective fault detection circuitry 470, 475 monitors the health of the pressure sensors 110, 112 and each of the electronics processing sections 120, 130, 420, 430, 460, 465, 490, 495 either by reading inputs and outputs, and comparing them either to known values or comparing the channels to each other. Faults or potential faults are then reported to aircraft warning and/or maintenance systems by respective fault reporting circuits 480, 485.

Figure 5A:
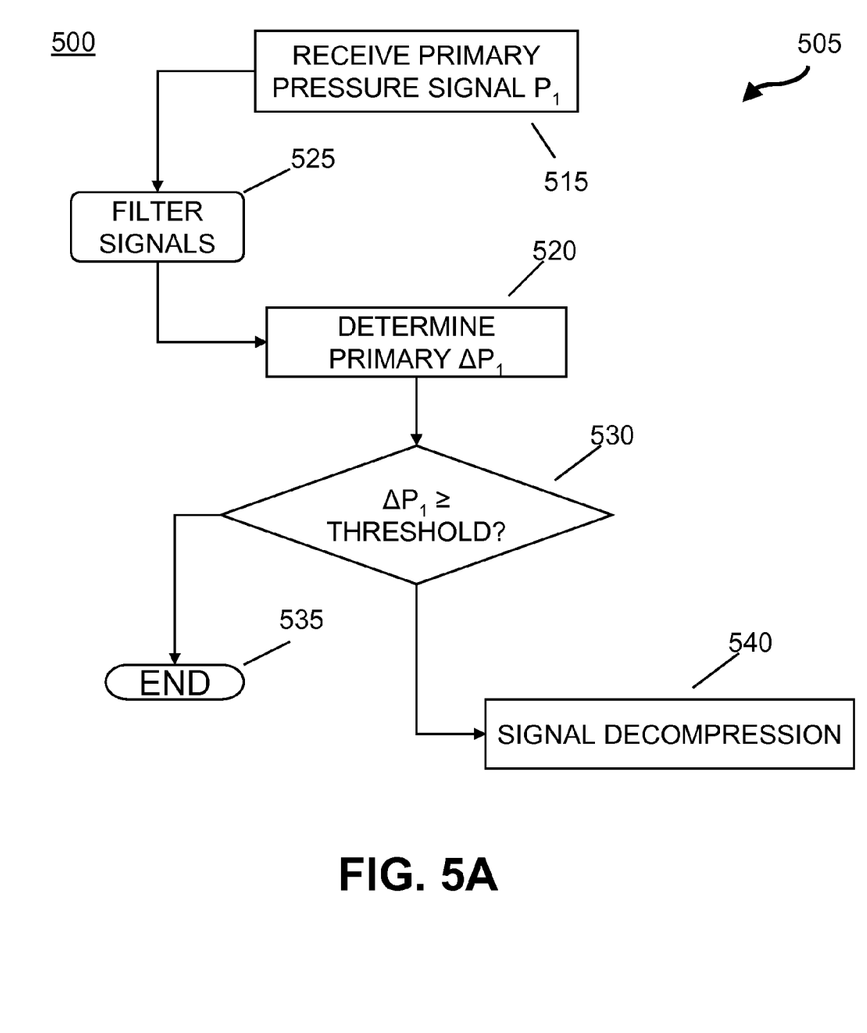
FIG. 5A is a flow chart of a method of monitoring pressure in an aircraft according to an embodiment of the invention.

FIG. 5A is a flow chart of a method of monitoring pressure in a compartment of an aircraft according to an embodiment of the invention. A method 500 includes a process 505 for each monitoring channel 105. It should be appreciated that, if additional monitoring channels are used, there would be a similar process associated with each monitoring channel. The process 505 for the primary monitoring channel 105 includes receiving a pressure signal corresponding to a pressure $P_1$ within a primary compartment of an aircraft (such as, for example, cockpit 40). Next, a change in pressure $\Delta P_1$ is determined (step 520)

In a preferred embodiment, at step 525, signals are filtered that are outside of a predetermined frequency band. At step 530, a determination is made as to whether the pressure change $\Delta P_1$ meets a predetermined threshold. In the illustrated step 530, a greater than or equal to comparison is made, although the invention is not intended to be so limited. If the determination is NO, then the process 505 ends (step 535). If the determination is YES, then a notification signal is provided indicating that a decompression event has occurred (step 540).

Figure 5B:
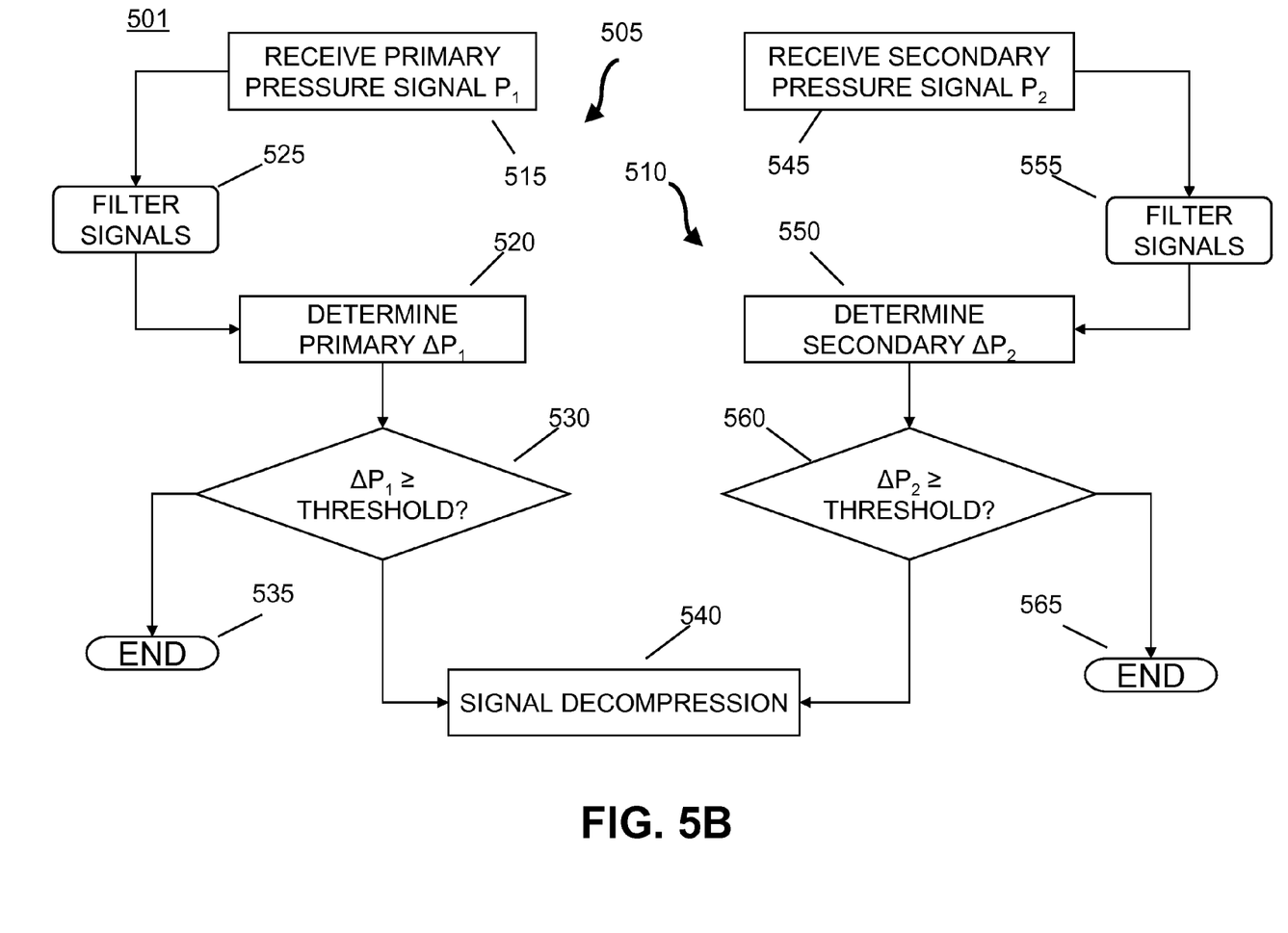
FIG. 5B is a flow chart of another method of monitoring pressure in an aircraft according to an embodiment of the invention.

FIG. 5B is a flow chart of another method 501 of monitoring pressure in an aircraft according to an embodiment of the invention. The method 501 includes the steps of the method 500, but further includes a process 510 that is similar to process 505, but is carried out for the secondary monitoring channel 405. The process 510 includes receiving a pressure signal corresponding to a pressure $P_2$ within a secondary compartment within the aircraft. Next, a change in pressure $\Delta P_2$ is determined (step 550).

In a preferred embodiment, at step 555, signals are filtered by a bandpass filter, and at step 560, a determination is made as to whether the pressure change $\Delta P_2$ meets the predetermined threshold. In the illustrated step 560, a greater than or equal to comparison is made, although the invention is not intended to be so limited. If the determination is NO, then the process 510 ends (step 565). If the determination is YES, then a notification signal is provided indicating that a decompression event has occurred (step 540).

It should be noted that the predetermined thresholds for the primary and secondary compartments may be the same or different. It should further noted that either or both of the processes 505, 510 may lead to signaling a decompression (step 540). The processes 505, 510 may run simultaneously, i.e., pressure signals from each monitoring channel 105, 405 may be processed in parallel. Furthermore, each monitoring channel 105-N (FIG. 3A) may employ a similar process as processes 505 or 510.

Figure 6A:
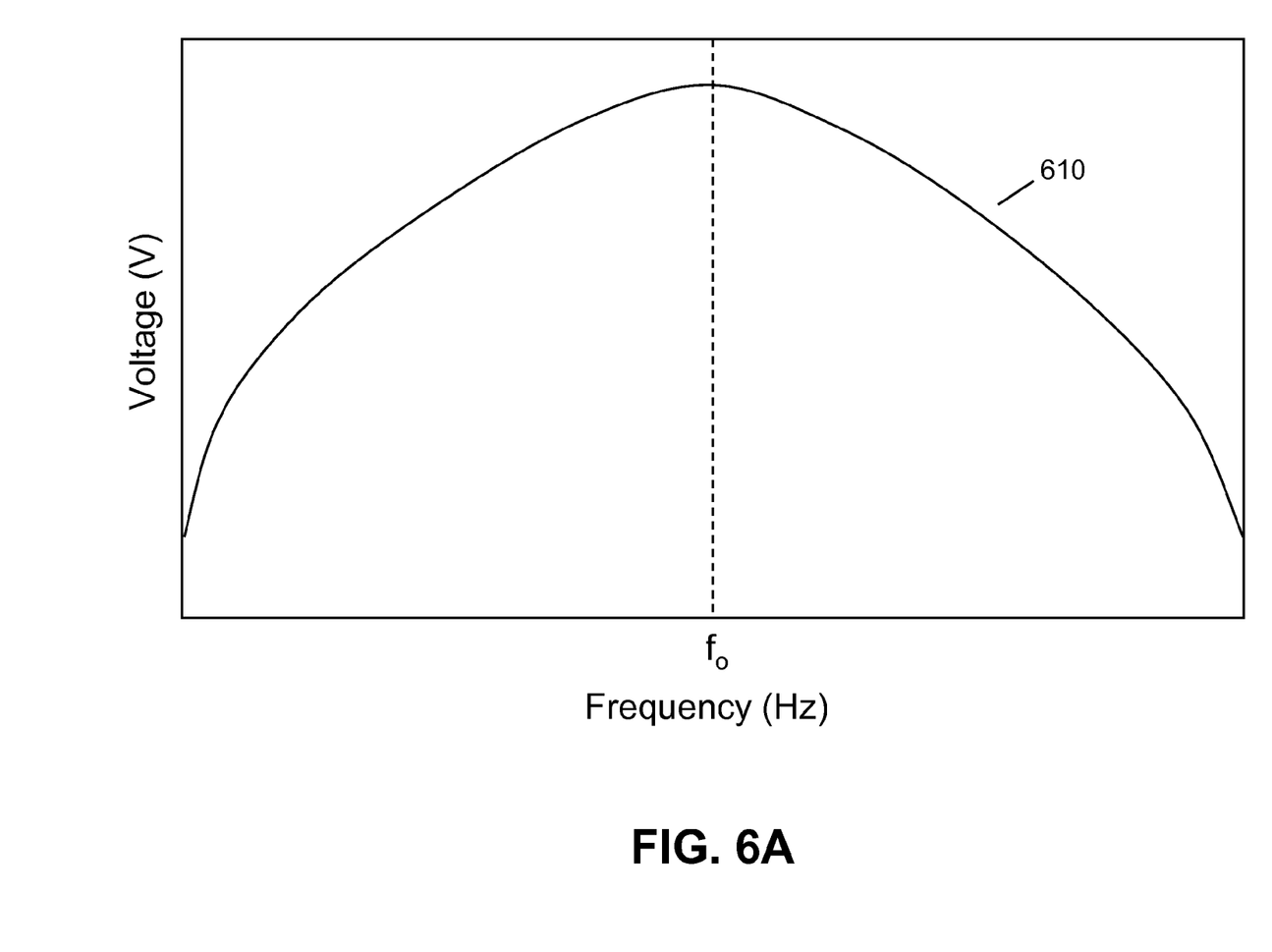
FIG. 6A is a graph of a frequency response in accordance with an embodiment of the invention.
Figure 6B:
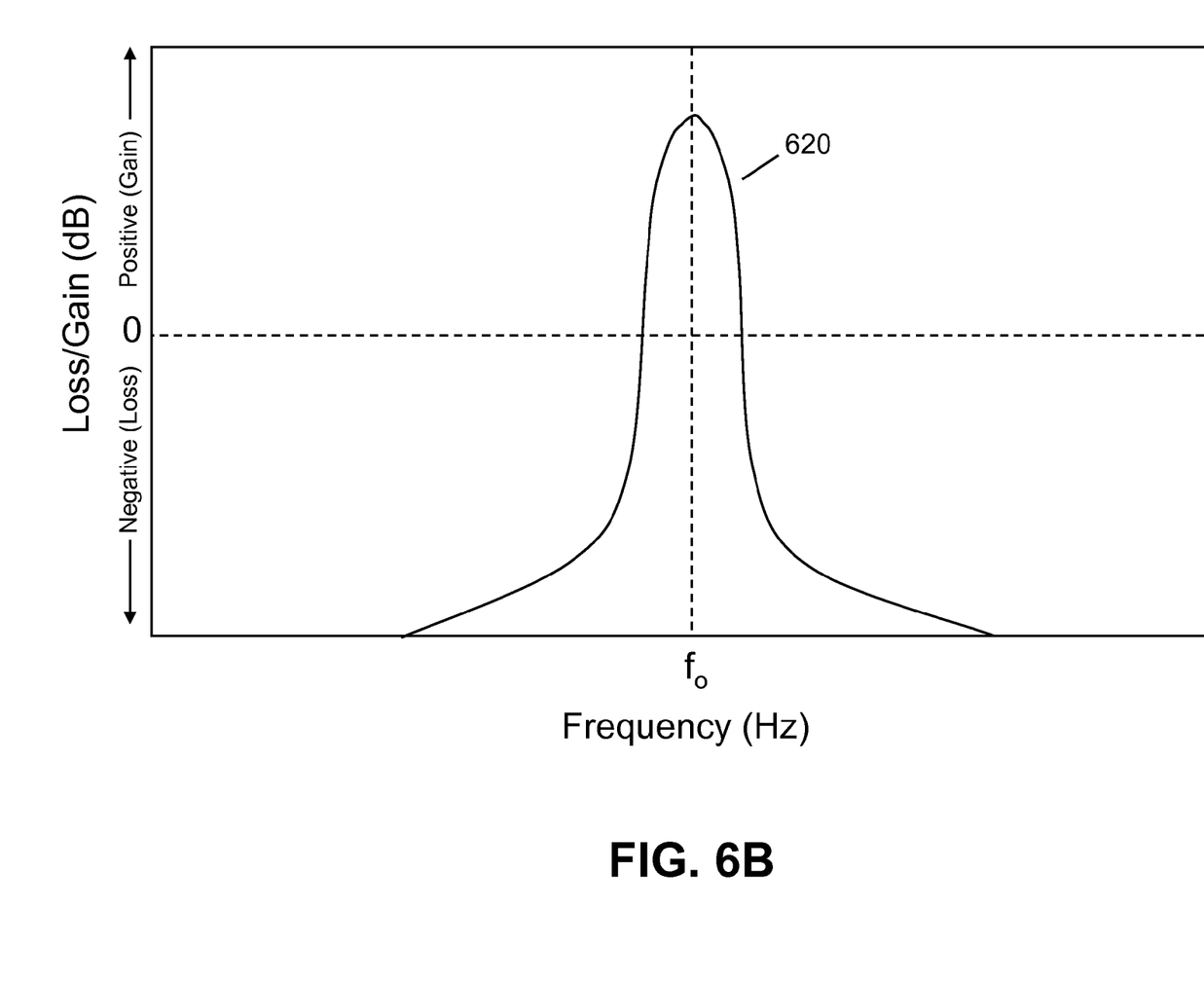
FIG. 6B is another graph of a frequency response in accordance with an embodiment of the invention.

FIG. 6A is a graph of a frequency response in accordance with an embodiment of the invention. The x-axis is a logarithmic scale of frequency of a pressure input to the pressure sensors 110, 112. Voltage response line 610 shows the voltage output of the threshold logic circuits 140, 440. FIG. 6B is another graph of a frequency response in accordance with an embodiment of the invention. Amplitude response line 620 shows the amplification of responses which are within the target range around a center frequency f0, i.e., they are above the dotted zero-gain line, below which the signal is attenuated. These are the signals for which there may be a valid decompression and are not filtered by band pass filters 120, 420, 490, 495. The positive frequency response may be, for example, within a band of 4 psi/s to 200 psi/s.

Embodiments of the invention include means for performing any of the above-described actions and/or steps.

It should be noted that, although the threshold logic circuits 140, 440 may pass a range of pressure signals based on their respective rates of change, there is no independent measurement for a rate of change in pressure $\Delta P/\Delta t$ in the systems 100, 200. Rather, a determination of whether action is required is based on the absolute change in pressure, which requires less processing and response time.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A system for monitoring pressure change within at least one compartment of an aircraft, comprising:
   a primary pressure sensor for providing a signal corresponding to a pressure within a primary compartment of an aircraft;
   a primary monitoring channel, coupled to the primary pressure sensor, comprising:
      a band pass filter for receiving and filtering the primary pressure signal,
      a pressure change circuit for determining a change in the filtered pressure signal and for providing a pressure change output signal corresponding to the change in pressure; and
      a threshold logic circuit for determining whether the pressure change output signal meets a predetermined threshold and for providing a threshold output signal indicating that a decompression event has occurred if the pressure change output signal meets the predetermined threshold;
   a secondary pressure sensor for providing a signal corresponding to a pressure within a secondary compartment of an aircraft adjacent to the primary compartment;
   a secondary monitoring channel, coupled to the secondary pressure sensor, comprising:
      a band pass filter for receiving and filtering the secondary pressure signal,
      a pressure change circuit for determining a change in the filtered pressure signal and for providing a pressure change output signal corresponding to the change in pressure; and
      a threshold logic circuit for determining whether the pressure change output signal meets the predetermined threshold and for providing a threshold output signal indicating that a decompression event has occurred if the pressure change output signal meets the predetermined threshold;
   an output driver, coupled to the primary monitoring channel and the secondary monitoring channel, for receiving the primary threshold output signal and the secondary threshold output signal, for outputting a notification signal; and
   respective symmetry checkers configured to determine whether the decompression event is valid, the symmetry checkers associated with each of the primary and secondary monitoring channels, the symmetry checkers each receiving an input from a respective symmetry band pass filter, and the symmetry checkers outputting a signal to the threshold logic circuit,
   wherein each of the primary and secondary monitoring channels includes respective fault detection comparison circuits for comparing the primary and secondary pressure sensor signals to known values, or to each other, to determine whether an input error occurs indicating a health condition exists in one of the primary or secondary pressure sensors, and fault detection reporting circuits for reporting that a health condition exists.

2. The system of claim 1, wherein each of the fault detection comparison circuits monitor respective band pass filter signals, pressure change signals, and symmetry checker signals.

3. The system of claim 1, wherein each of the primary and secondary pressure sensors includes a pressure detector and an amplifier for receiving a pressure signal from the pressure detector, wherein the output of the amplifier provides a feedback input to the amplifier.

4. The system of claim 3, wherein the pressure sensor amplifier is coupled to a positive and a negative voltage supply.

5. The system of claim 3, wherein each of the primary and secondary pressure sensors includes a series resistor-capacitor (RC) filter having an input coupled to the pressure detector and an output coupled to the amplifier.

6. The system of claim 3, wherein each of the primary and secondary pressure monitoring channels includes a DC coupling circuit disposed within the band pass filter.

7. The system of claim 3, wherein each of the primary and secondary band pass filters includes a voltage divider for adjusting the gain of the filter.

8. The system of claim 3, wherein each of the primary and secondary pressure change signal circuits includes an amplifier coupled to a positive and a negative voltage supply, wherein the output of the amplifier provides a feedback input to the amplifier.

9. The system of claim 1, wherein each of the primary and secondary band pass filters filter signals outside a range of about 4 psi/second to about 200 psi/second.

10. A method of monitoring pressure change within at least one compartment of an aircraft, comprising:
   receiving a pressure signal into a primary pressure sensor corresponding to a pressure within a primary compartment of an aircraft;
   determining a change in the primary pressure signal;
   determining whether the primary pressure change meets a predetermined threshold;
   if the primary pressure change meets the predetermined threshold, providing a notification signal indicating that a decompression event has occurred;
   receiving a pressure signal into a secondary pressure sensor corresponding to a pressure within a secondary compartment of the aircraft disposed adjacent to the first compartment;
   determining a change in the secondary pressure signal;
   determining whether the secondary pressure change meets a predetermined threshold;
   if the secondary pressure change meets the predetermined threshold, providing a notification signal indicating that a decompression event has occurred;
   determining whether the decompression event is valid utilizing respective symmetry checkers, the symmetry checkers associated with each of the primary pressure signal and secondary pressure signal, the symmetry checkers each receiving an input from a respective symmetry band pass filter, and the symmetry checkers outputting a signal indicating validity, comparing the primary and secondary pressure sensor signals to known values, or to each other, to determine whether an input error occurs indicating a health condition exists in one of the primary or secondary pressure sensors; and reporting that a health condition exists via a fault detection reporting circuit.

11. The method of claim 10, further comprising filtering the primary pressure signals that are outside a predetermined frequency band.

12. The method of claim 11, further comprising filtering the secondary pressure signals that are outside a predetermined frequency band.

13. A system for monitoring pressure change within at least one compartment of an aircraft, comprising:

means for receiving a pressure signal corresponding to a pressure within a primary compartment of an aircraft;

means for filtering the primary pressure signals that are outside a predetermined frequency band;

means for determining a change in the primary pressure signal;

means for determining whether the primary pressure change meets a predetermined threshold;

means for providing a notification signal indicating that a decompression event has occurred if the primary pressure change meets the predetermined threshold;

means for receiving a pressure signal corresponding to a pressure within a secondary compartment of the aircraft adjacent to the first compartment;

means for filtering the secondary pressure signals that are outside a predetermined frequency band;

means for determining a change in the secondary pressure signal;

means for determining whether the secondary pressure change meets a predetermined threshold;

means for providing a notification signal indicating that a decompression event has occurred if the secondary pressure change meets the predetermined threshold;

means for determining whether the decompression event is valid comprising respective symmetry checkers, the symmetry checkers associated with each of the primary pressure signal and secondary pressure signal, the symmetry checkers each receiving an input from a respective symmetry band pass filter, and the symmetry checkers outputting a signal indicating validity; and means for comparing the primary and secondary pressure sensor signals to known values, or to each other, to determine whether an input error occurs indicating a health condition exists in one of the primary or secondary pressure sensors; and means for reporting that a health condition exists.

* * * * *